US011299100B1

(12) United States Patent
Clifford et al.

(10) Patent No.: US 11,299,100 B1
(45) Date of Patent: Apr. 12, 2022

(54) VEHICLE INCLUDING DEPLOYABLE FASTENER AND TOOL CARRIER IN CARGO AREA

(71) Applicant: Ford Global Technologies, LLC, Dearborn, MI (US)

(72) Inventors: Daniel Clifford, Canton, MI (US); Tanner Ardaiz, Westland, MI (US); Jason Weaver, Livonia, MI (US); Salvatore Moceri, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 17/039,818

(22) Filed: Sep. 30, 2020

(51) Int. Cl.
*B60R 5/04* (2006.01)
*B60R 11/06* (2006.01)
*B60R 7/02* (2006.01)
*B60R 11/00* (2006.01)

(52) U.S. Cl.
CPC .............. *B60R 5/044* (2013.01); *B60R 7/02* (2013.01); *B60R 11/06* (2013.01); *B60R 2011/0036* (2013.01)

(58) Field of Classification Search
CPC .......... B60R 5/044; B60R 7/02; B60R 11/06; B60R 2011/0036; B60R 13/013; B60R 5/04; B62D 43/10
USPC ............................................. 296/37.16, 37.3
See application file for complete search history.

(56) References Cited

U.S. PATENT DOCUMENTS

| | | | | |
|---|---|---|---|---|
| 5,518,158 A | * | 5/1996 | Matlack | B60R 9/00 224/402 |
| 6,290,277 B1 | * | 9/2001 | Spykerman | B60R 5/04 224/496 |
| 6,719,348 B1 | * | 4/2004 | Song | B60R 5/04 296/37.14 |
| 6,886,713 B1 | * | 5/2005 | Scherrer | B60R 11/06 220/817 |
| 6,929,303 B1 | * | 8/2005 | Sharples | B60J 7/1621 296/100.05 |
| 6,945,594 B1 | * | 9/2005 | Bejin | B60R 5/04 296/193.07 |
| 9,216,697 B1 | * | 12/2015 | Hayes | E05G 1/04 |

(Continued)

FOREIGN PATENT DOCUMENTS

DE 3457501 B2 8/2003
DE 10 2007 041 146 A1 3/2009

(Continued)

*Primary Examiner* — D Glenn Dayoan
*Assistant Examiner* — Kevin P Weldon
(74) *Attorney, Agent, or Firm* — Vichit Chea; Price Heneveld LLP

(57) ABSTRACT

A vehicle includes a rear cargo scuff and a rear cargo area that has a floor including a cover that can be selectively opened to access a tool tray below the floor. A tool tray is connected to the rear cargo scuff by a first hinge. The tool tray is configured to rotate between a first position and a second position, such that the tool tray rests below a top surface of the floor in the first position and is positioned above the top surface of the floor in the second position. The tool tray also includes a tool receiving portion configured to receive one or more tools. The tool tray includes a lid coupled to a second hinge, where the lid is configured to rotate between a closed position and an open position via a second hinge.

18 Claims, 12 Drawing Sheets

(56) References Cited

U.S. PATENT DOCUMENTS

| | | |
|---|---|---|
| 9,539,957 B2 | 1/2017 | Engerman |
| 10,137,839 B1* | 11/2018 | Kelley, Jr. ................. B60R 5/04 |
| 2012/0325877 A1* | 12/2012 | Franks .................... B60R 11/06 |
| | | 224/404 |
| 2017/0136958 A1* | 5/2017 | Smith ..................... B60R 11/06 |
| 2020/0180707 A1* | 6/2020 | Johnson ............. B62D 33/0273 |

FOREIGN PATENT DOCUMENTS

| | | |
|---|---|---|
| DE | 199 48 647 B4 | 1/2011 |
| DE | 102 44 768 B4 | 11/2013 |
| KR | 19980024041 U * | 7/1998 |

* cited by examiner

VEHICLE INCLUDING DEPLOYABLE FASTENER AND TOOL CARRIER IN CARGO AREA

TECHNICAL FIELD

The present disclosure is directed to a tool carrier or tray provided in a rear cargo area of a vehicle.

BACKGROUND

The rear cargo area of a vehicle is often utilized to store cargo, like suitcases, groceries, or other items, including equipment that can be used to make minor roadside repairs. Accordingly, the rear cargo area of many vehicles may include a selectively accessible recess under the floor for storing a spare tire and tire changing tools, such as a car jack and tire iron. Conventionally, if the operator of the vehicle desires to store any additional tools in the vehicle, these tools are loosely placed on the floor of the rear cargo area in bins, toolboxes or other non-fixed containers. This reduces the space in the rear cargo area that can be used to store other equipment. Furthermore, it can be a hassle for users to secure these additional tools in a way that keeps them organized, from tumbling, and making rattling noises during operation of the vehicle. In addition, loose tools can be easily lost or cause damage to other cargo stored in the rear cargo area as well as to the rear cargo area itself.

BRIEF SUMMARY

The present disclosure relates to a system and method for stowing tools in a rear cargo area of a vehicle. Embodiments of the present disclosure enable storage of tools in the vehicle in a way that does not occupy floor space of the rear cargo area. The tool tray securely holds the tools and keeps the tools organized.

In one embodiment, a vehicle includes a tool tray that is coupled to a rear cargo scuff of the vehicle. The tool tray is stored below the floor of the rear cargo area. The tool tray can be beneficial in many circumstances. For example, some vehicles are designed to allow a user to remove doors or other features depending on an environment in which the vehicles are being used. For some activities, such as off-roading or rock climbing, some users may choose to remove their doors. The tool tray is fixedly attached to the vehicle and is configured to store fasteners from the doors with the vehicle when the doors are removed. This reduces the likelihood that the user will lose the fasteners when opting to remove the doors.

In one embodiment, a vehicle includes a tool tray stowed below a rear cargo area of the vehicle. The tool tray is configured to store one or more tools inside a tool receiving portion formed in the tool tray. The tools can include fasteners for removable doors of the vehicle. The tools can include one or more wrenches or other tools useful in removing the doors. The vehicle can include other removable features for which tools or parts can be stored in the tool tray. The tool tray is deployed in an opening formed in a floor of the rear cargo area. The opening is covered by a cover that is part of the floor. The tool tray is accessible by removing or opening the cover. The tool tray is a single, integral feature that is physically coupled to the vehicle while being adaptable to provide access to various aspects of the cargo area.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with engine compartments have not been shown or described in detail to avoid unnecessarily obscuring descriptions of the embodiments.

Figure 1A:
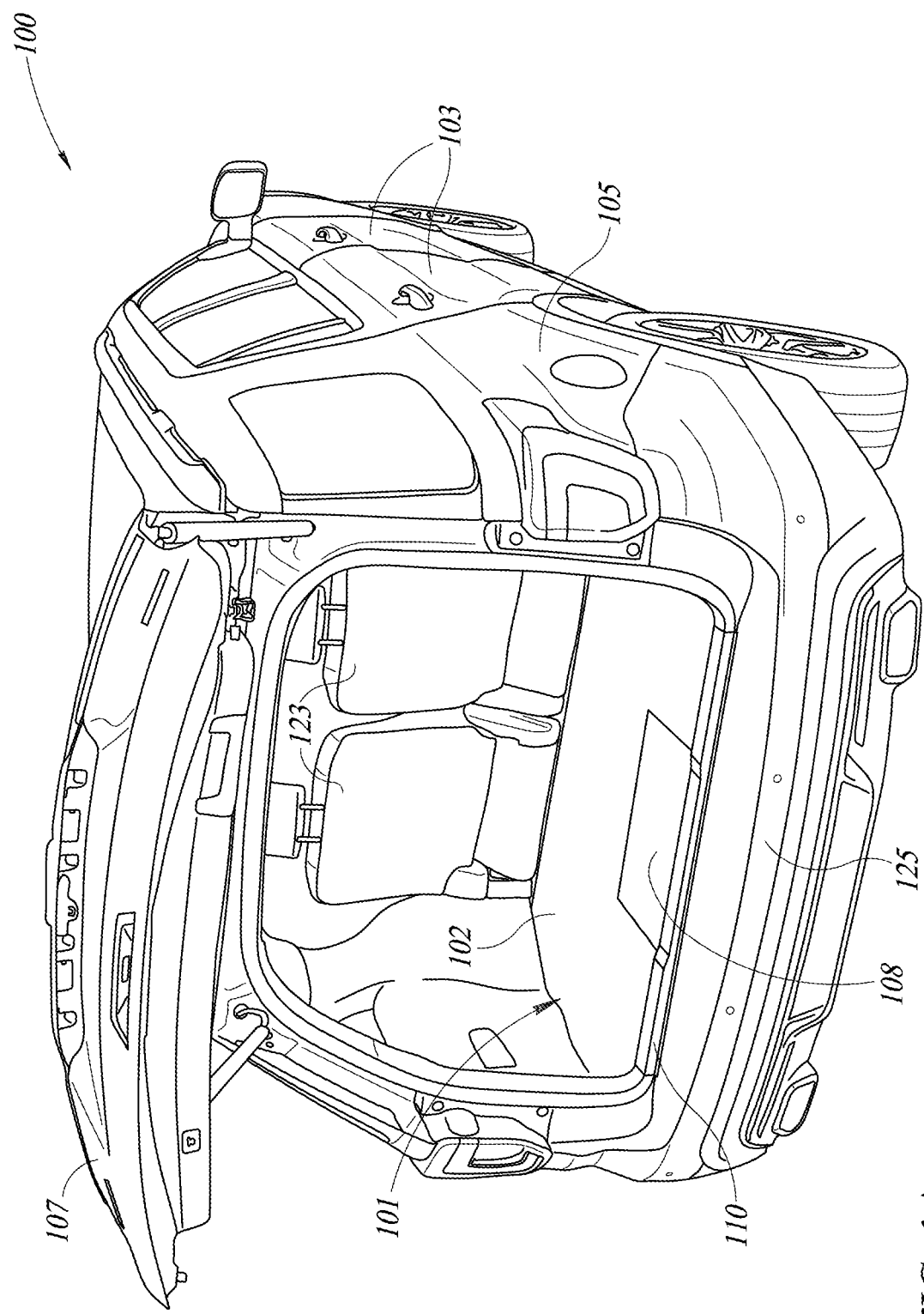
FIG. 1A is a perspective view of a vehicle, according to an embodiment of the present disclosure.

FIG. 1A is a rear perspective view of a vehicle 100, according to an embodiment. The vehicle 100 includes a body 105. The body 105 of the vehicle 100 includes one or more detachable doors 103, a rear cargo door 107, a rear bumper 125, and a rear cargo scuff 110. In practice, the body 105 of the vehicle 100 can include many other components and arrangements of components than those expressly described herein.

The rear cargo door 107 is mounted to a rear end of the vehicle 100. In the open position, as shown in FIG. 1A, the rear cargo door 107 provides access to a rear cargo area 101 of the vehicle. From the open position, the rear cargo door 107 can be rotated downward to a closed position (not shown). In the closed position, the rear cargo door 107 may abut the rear cargo scuff 110. When the rear cargo door 107 is closed, the bumper 125 is positioned lower than the rear cargo door 107. While in the embodiment of FIG. 1A the rear cargo door 107 is shown as an upwards opening door, in other embodiments, the rear cargo door 107 can be a sideways opening door.

The rear cargo area 101 is in the interior of the vehicle toward a rear end of the vehicle 100. In particular, the rear cargo area 101 may correspond to the interior space of the vehicle between rear seats 123 of the vehicle and the rear cargo door 107 when the rear cargo door 107 is closed. The rear cargo area 101 includes a floor 102. The rear cargo area 101 may be utilized to receive and store cargo. The cargo can placed or stacked on the floor 102.

The floor 102 includes a cover 108 that can assume an open position (see FIG. 1B) and a closed position, as shown in FIG. 1A. As will be discussed in greater detail in subsequent figures, the cover 108 in the open position provides access to a storage area (not shown) formed underneath the cover 108. In contrast, in the closed position the cover prevents access to the storage area below the cover 108. In the closed position, the cover 108 is flush with the rest of the floor 102. Accordingly, the floor 102 is substantially flat.

The rear cargo scuff 110 is positioned at a rear end of the rear cargo area 101. The rear cargo scuff 110 abuts the floor 102. The rear cargo scuff 110 may serve to prevent damage to the vehicle 100 from the closing of the rear cargo door 107 of the vehicle 100, as well as from loading and unloading cargo from the rear cargo area 101. In an example in which the vehicle 100 has an upward-opening rear cargo door 107, such as is common in sport utility vehicles and hatchbacks, a bottom of the rear cargo door 107 may close against the rear cargo scuff 110. Accordingly, the rear cargo scuff 110 may include a durable material, such as polymeric material. The material of the rear cargo scuff 110 is selected to withstand impacts from the door, from cargo, and people climbing in and out of the rear cargo area 101. When the rear cargo door 107 is closed, the rear cargo scuff 110 may be entirely within the interior of the vehicle 100. The rear bumper 125 is positioned lower than the rear cargo scuff 110 and protrudes outward from the rear of the vehicle.

The cover 108 of the floor 102 can be selectively openable. In one embodiment, the cover 108 may act as a removable portion of the floor 102 that can be entirely removed from the rear cargo area 101. Alternatively, the cover 108 may be a door or hatch that can be opened such that the portion of the floor 102 corresponding to the cover 108 may swing open via a hinge or other mechanism. Accordingly, the cover 108 may be pivotally mounted to the rest of the floor 102. Additional details of the rear cargo area 101 are provided with respect to FIG. 1B.

Figure 1B:
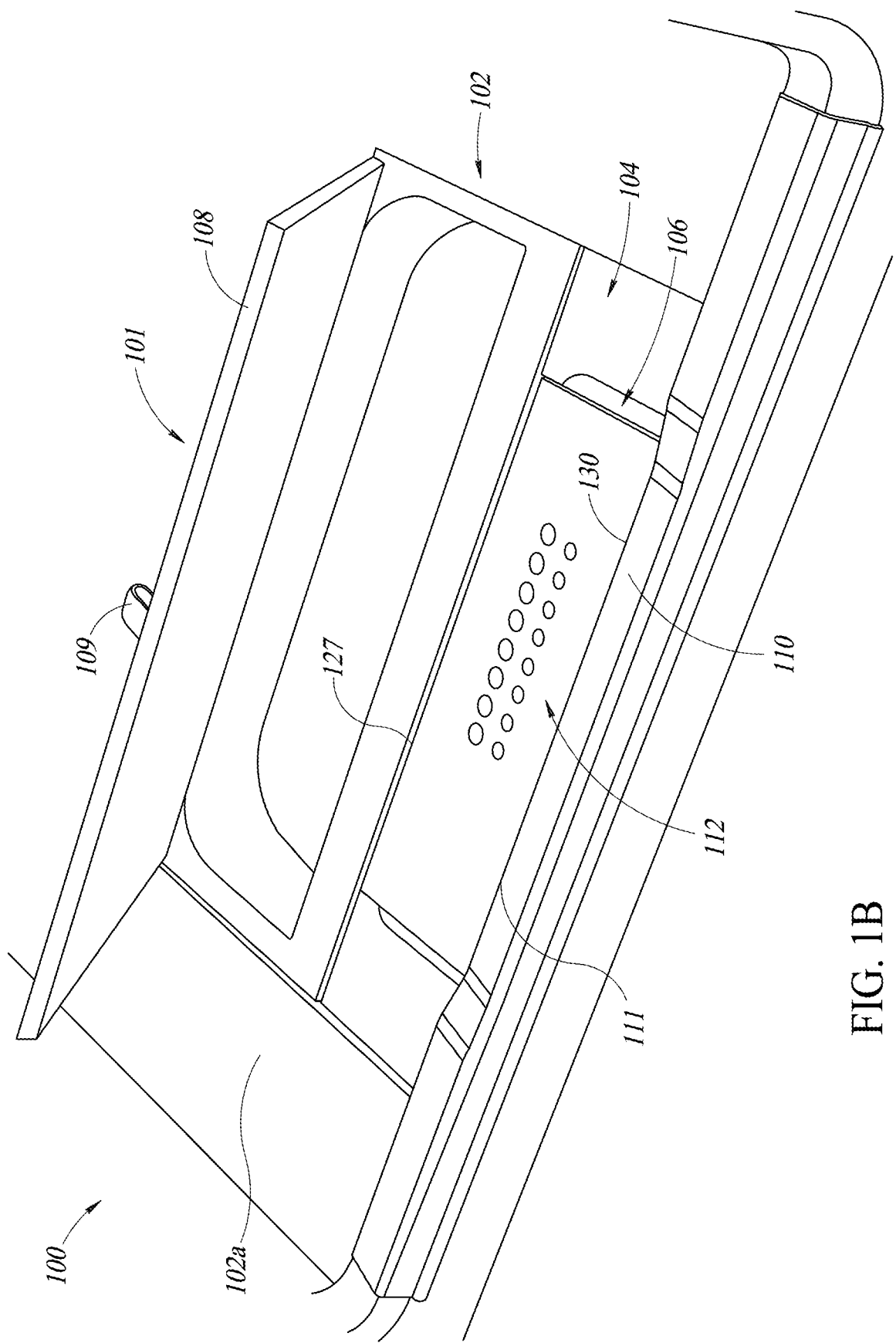
FIG. 1B is a perspective view of a rear cargo area of the vehicle of FIG. 1A including a tool tray, according to an embodiment of the present disclosure.

FIG. 1B is a perspective view of the rear cargo area 101, according to an embodiment. As mentioned above, the rear cargo area 101 includes the floor 102 with the openable cover 108. The cover 108 covers an opening 104 in the floor 102. The cover 108 may include an opening mechanism 109. The opening mechanism 109 enables an operator to open or remove the cover 108. The opening mechanism 109 can include a lever, a handle, a push button, or another type of mechanism that can enable an operator to open or remove the cover 108.

In one embodiment, the rear cargo area 101 includes a storage area 106 below the floor 102 which is selectively accessible by removing the cover 108. Specifically, when the cover 108 is removed or opened, the opening 104 in the floor 102 is exposed. The opening 104 provides access to the storage area 106 underneath the floor 102. Accordingly, the cover 108 is configured to provide selective access to the storage area 106.

In one example, the storage area 106 may include a recess or cavity that accommodates a spare tire and tire changing equipment, such as a car jack and a tire iron. The spare tire and tire changing equipment can be accessed by opening the cover 108. Additionally, or alternatively, the storage area 106 may be used to store other types of cargo.

In one embodiment, the vehicle 100 includes a tool tray 112 positioned within the opening 104 in the floor 102. The tool tray 112 is configured to store tools. The tools can include screwdrivers, wrenches, ratchets, fasteners, and plyers, for example. The tool tray 112 may include a carrier box or a tool cabinet that stores tools used to perform roadside repairs or small modifications in the vehicle 100, thereby eliminating a need for visiting a mechanic or a workshop.

Figure 5:
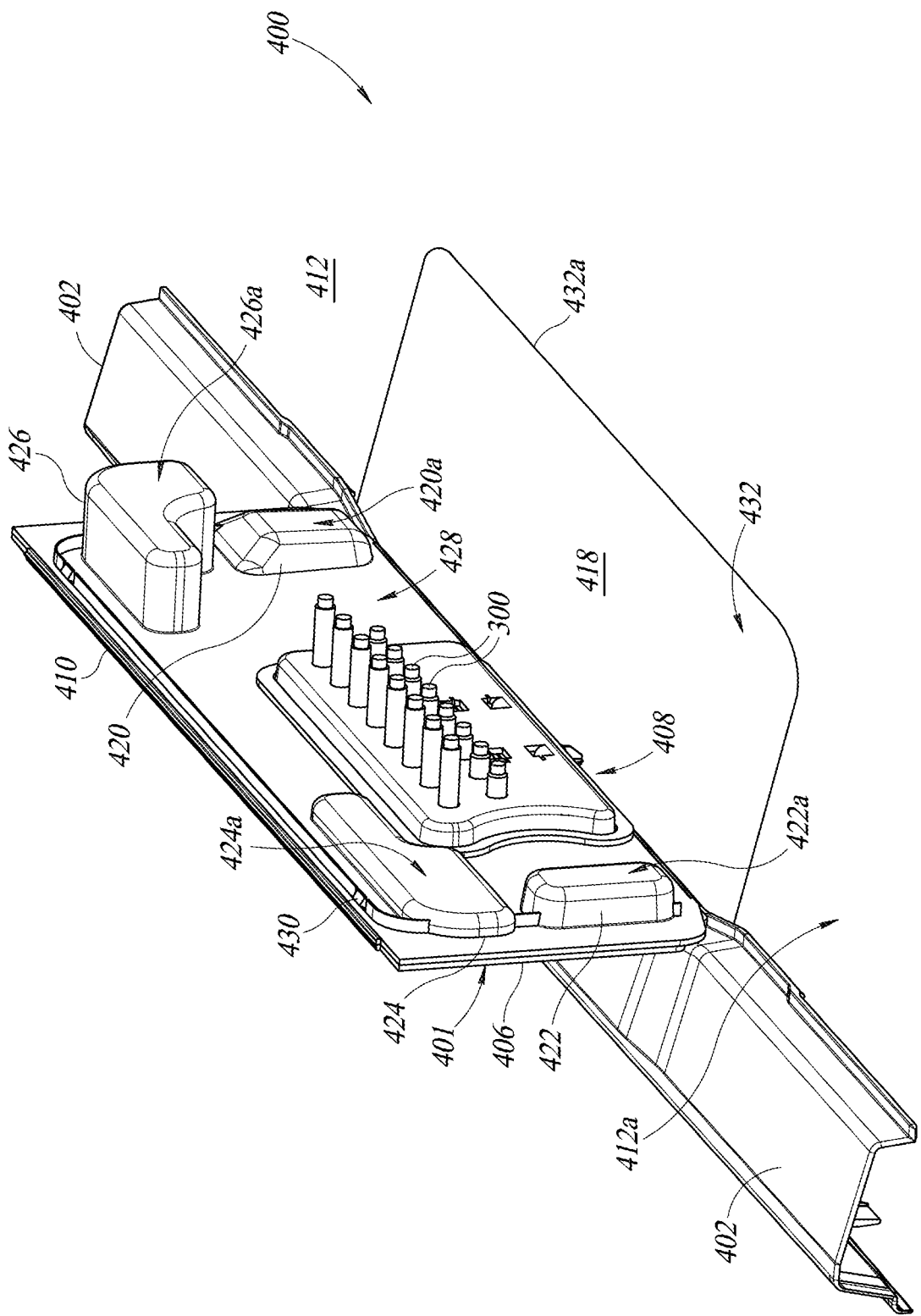
FIG. 5 is a perspective view of the rear cargo area of FIG. 4 including a tool tray in a second position, according to an embodiment of the present disclosure.

In one embodiment, the tool tray 112 pivots or rotates between a first position and a second position. The first position is a stowed position. The second position is an interior access position. In the first position, the tool tray 112 rests in the opening 104, below a top surface 102a of the floor 102. In other words, the tool tray 112 is placed beneath the floor 102 in the first position. In one embodiment, when the tool tray 112 is in the first position, the cover 108 may be closed to form a surface that is uniform to that of the top surface 102a of the floor 102. In other words, the cover 108 when closed remains uniform with the top surface 102a of the floor 102. Accordingly, in the first position, the tool tray 112 does not reduce the cargo-carrying capacity of the floor 102. In the first position, the tool tray 112 rests above the storage area 106. The tool tray 112 rotates, via a hinge or pivot, as will be explained in more detail below, to the second position. In the second position, the tool tray 112 is moved from out of the opening 104 and above the floor 102 by swinging the tool tray 112 with respect to the rear cargo scuff 110. In the second position, the tool tray 112 does not cover the storage area 106 and therefore, the storage area 106 is accessible in the second position. Thus, cargo that is stored in the storage area 106 can be accessed by moving the tool tray to the second position. Though FIG. 1B does not show the tool tray 112 in the second position, the tool tray 401 of FIG. 5 is an example of similar a tool tray in a second position.

In one embodiment, the tool tray 112 is coupled to the rear cargo scuff 110. In particular, a first end 111 of tool tray 112 is coupled to the rear cargo scuff 110. While not shown explicitly in FIG. 1, the first end 111 of the tool tray 112 is coupled to the rear cargo scuff 110 through a first hinge 130 (illustrated more clearly in the view of FIG. 3). The first hinge 130 enables the tool tray 112 to rotate between the first position and the second position. In particular, when the tool tray 112 rotates to the second position, the tool tray 112 swings upward such that a second end 127 of the tool tray 112, opposite the first end 111, swings above the top surface 102a of the floor 102 and exposes the storage area 106.

In one embodiment, the first hinge 130 is a living hinge. The living hinge is made as an extension of the material of the tool tray 112 and the rear cargo scuff 110. In the example of a living hinge, at least a portion of the tool tray 112 is integral with the rear cargo scuff 110 and the living hinge. The living hinge may correspond to an integral, material connection between the rear cargo scuff 110 and tool tray 112 that has been thinned, compressed, or bent in such a way that the tool tray 112 can pivot about the thinned, compressed, or bent portion.

In one embodiment, the tool tray 112 is removably coupled to the rear cargo scuff 110, such that the tool tray 112 may be removed from the rear cargo area 101 of the vehicle 100 by decoupling the tool tray 112 from the rear cargo scuff 110 along the first hinge 130. The tool tray 112 may be removed using techniques that are suitable to remove the coupling between the first hinge 130 and the rear cargo scuff 110. For instance, when the tool tray 112 is coupled to the rear cargo scuff 110 using one or more fasteners, the tool tray 112 can be decoupled from the rear cargo scuff 110 by loosening and removing the fasteners.

Figure 2:
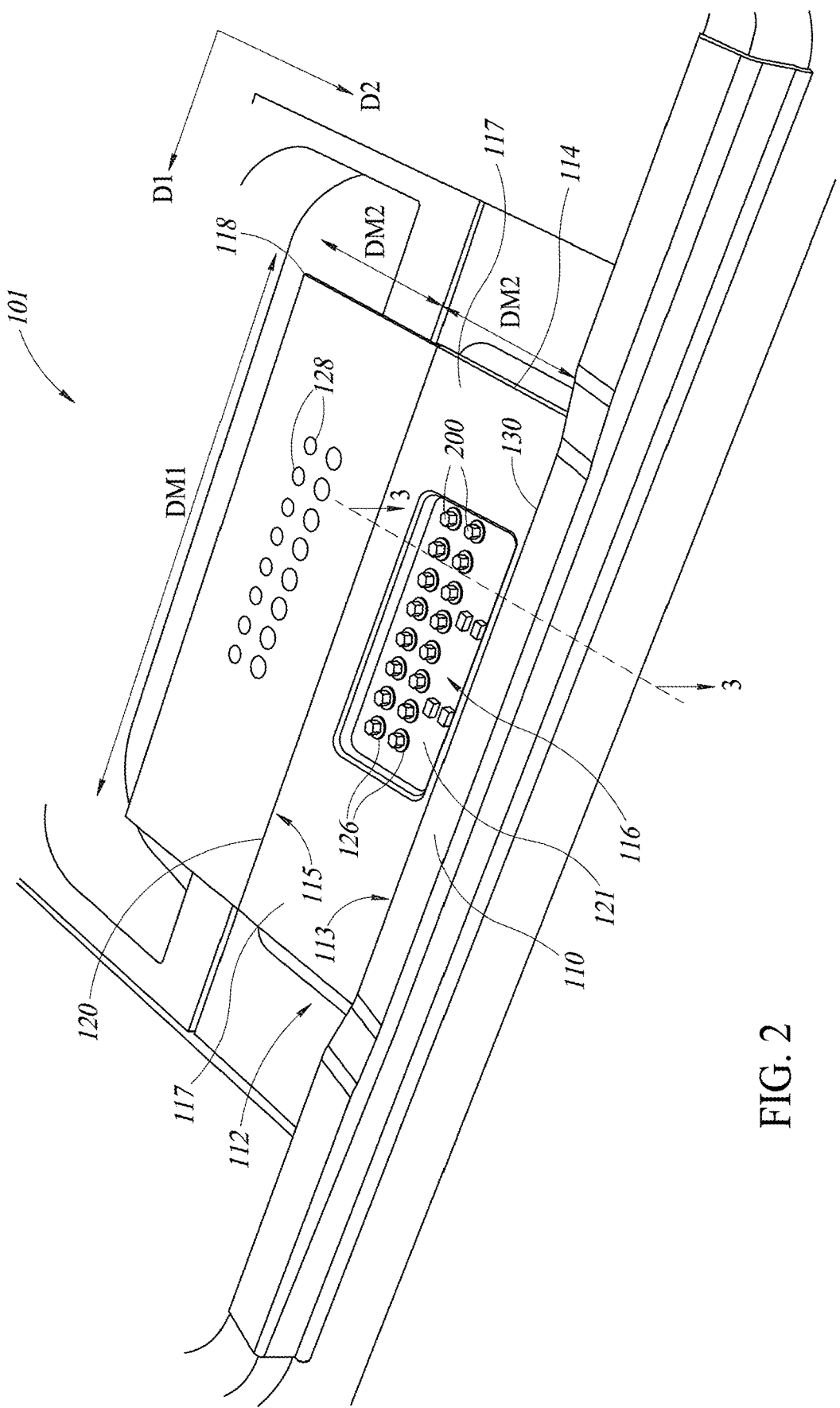
FIG. 2 is a perspective view of the tool tray of FIG. 1B in an open position, according to an embodiment of the present disclosure.

FIG. 2 is a perspective view of the rear cargo area 101 of the vehicle 100 with the tool tray 112, according to an embodiment. In the view of FIG. 2, the cover 108 is open or removed, thereby providing access to the tool tray 112. The cover 108 is not shown in the view of FIG. 2 for clarity in illustrating the structure and function of the tool tray 112.

The tool tray 112 includes a tool receiving portion 114 and a lid 118. The tool receiving portion 114 receives and holds tools. The lid 118 is selectively openable to provide access to the tool receiving portion 114. In the view of FIG. 2, the lid 118 is in an open position, thereby exposing the tool receiving portion 114.

In one embodiment, the tool receiving portion 114 has a first side 113 proximal to the rear cargo scuff 110, a second side 115 distal from the rear cargo scuff 110. The first side 113 of the tool receiving portion 114 of the tool tray 112 is coupled to the rear cargo scuff 110 by the first hinge 130. The second side 115 of the tool receiving portion 114 is coupled to the lid 118 by a second hinge 120 (see FIG. 2), as will be described in more detail below.

In one embodiment, the tool receiving portion 114 includes a recess 116, and a support region 117. The support region 117 surrounds the recess 116. The recess 116, in the illustrated embodiment, is a depression formed in the tool receiving portion 114. The recess 116 accommodates one or more tools 200. The recess 116 may take any suitable form, such as a cavity or a well, suitable to receive and store the one or more tools 200. In one example, the bottom and side surfaces of the recess 116 may be integral with the support region 117. In another example, the recess 116 may be formed as a separate component that may be coupled to the support region 117 using suitable coupling mechanisms. Exemplary techniques that may be employed to form the recess 116 may include injection molding and/or punching. When the lid 118 is closed, the lid 118 rests on the support region 117.

In one embodiment, the recess 116 includes a first plurality of apertures 126. The apertures 126 may each be sized to accommodate a portion of a respective one of the tools 200. Accordingly, each aperture 126 may receive a respective tool 200. A lower portion of the tool 200, held by the aperture 126, extends downward through the aperture 126. The lower portion of the tool 200 may be suspended below the aperture 126 by an upper portion of the tool 200. The upper portion of the tool 200 may rest against a top surface 121 of the recess 116 around the aperture 126.

In one example, the first plurality of apertures 126 are configured to securely hold the tools 200. The apertures 126 can have a size selected, in combination with other aspects of the tool tray 112 to hold the tools 200 in such a way that the tools do not fall out of or otherwise become removed from the apertures 126 during operation of the vehicle 100. Accordingly, when the tools 200 are placed in the apertures 126 and the lid 118 is closed, the tools 200 are securely held.

In one embodiment, the apertures 126 are configured to assist in maintaining the organization of the tools 200. Each aperture 126 may be sized to receive a particular respective tool 200. The apertures 126 are configured such that each aperture 126 receives a tool 200 that is suitable to the shape and size of the aperture 126. For example, if a small tool 200 is placed in an aperture 126 designated for a larger tool 200, the larger tool 200 may not fit in any remaining aperture 126. Thus, the user will need to rearrange the tools 200 until each tool 200 is placed in an appropriate aperture. Accordingly, the sizes of the apertures 126 can be selected to promote the proper organization of the tools 200. Additionally or alternatively, the recess 116 can include markings indicating the proper aperture 126 for each tool 200.

In one embodiment, the apertures 126 are configured and sized to minimize rattling and squeaking noises from the tools 200 during operation of the vehicle 100. For example, loose tools may make squeaking or rattling noises if the loose tools are allowed to move or jostle during operation of the vehicle 100. For instance, the first plurality apertures 126 may be sized such that an upper portion of the one or more tools 200 rests on or abuts against the top surface 121 of the recess 116, while a bottom portion of the one or more tools 200 is retained within the first plurality of aperture 126. As a result, the movement of the one or more tools 200 is limited and hence the noise is minimized. The first plurality of apertures 126 may take on any suitable configuration such as, but not limited to, rectangular, circular, or square. In addition, any suitable manufacturing processes may be employed to form the first plurality of apertures 126 including injection molding, punching, and compression molding, for example.

The lid 118 is coupled to the second side of the tool receiving portion 114 distal to the rear cargo scuff 110 by a second hinge 120. The second hinge 120 enables the lid 118 to rotate or pivot between an open and closed position. In the view of FIG. 2, the lid 118 is in an open position. In the open position, the tool receiving portion 114 is accessible and the tools 200 can be removed or replaced. In the closed position, the lid 118 pivots around the second hinge 120 and covers the tool receiving portion 114. In the closed position, the lid 118 rests against the support region 117.

In one embodiment, the second hinge 120 may be a living hinge. In this case, the second hinge 120 is integral with the tool receiving portion 114 and the lid 118. Accordingly, the second hinge 120 is an extension of the material of the tool receiving portion 114 and the lid 118. The second hinge 120 may correspond to an integral, material connection between the tool receiving portion 114 and lid 118 that has been thinned, compressed, or bent in such a way that the lid 118 can pivot about the thinned, compressed, or bent portion.

In the example in which the second hinge 120 is a living hinge, the second hinge 120, and, by extension, the tool receiving portion 114 and the lid 118 may be made of tough, durable material. The material is selected such that the tool receiving portion may perform its tool holding functions and such that the lid 118 may rotate about the second hinge 120 thousands of times over the lifetime of the vehicle 100 without the second hinge 120 losing integrity and failing. In one embodiment, the second hinge 120, the tool receiving portion 114, the second hinge 120, and the lid 118 are made from a durable, heavy-duty plastic material. In one embodiment of the tool receiving portion 114, the second hinge 120 and the lid 118 are made from a composite material including one or more of plastic, fibers, and metal. Any suitable material may be used for the tool receiving portion 114, the second hinge 120, and the lid 118 without departing from the scope of the present disclosure.

In one embodiment, the lid 118 may be coupled to the tool receiving portion 114 by mechanisms other than a living hinge. The second hinge 120 may be a hinge that enables decoupling of the lid 118 from the tool receiving portion 114. The lid 118 and the tool receiving portion 114 may be coupled together using any suitable lid coupling mechanisms including, but not limited to, snap locking or magnetic locking, for example. Additionally, a lid coupling mechanism may secure the lid 118 in the closed position to prevent inadvertent opening of the lid 118.

In one embodiment, in the closed position, the lid 118 assists in securely holding the tools 200 in the tool receiving portion 114. This reduces the possibility that tools can fall out or otherwise become removed from the tool receiving portion. Additionally, the lid 118 can promote the organization of the tools 200. Furthermore, the lid 118 reduces rattling and squeaking noises from the tools 200 by preventing any play or relative motion of the one or more tools 200 with respect to the tool tray 112.

In one embodiment, the lid 118 includes a second plurality of apertures 128. The second plurality of apertures 128 accommodates the upper portions of the one or more tools 200. When the tools 200 are placed in the apertures 126 and the lid 118 is closed, upper portions of the tools 200 protrude upward through the apertures 128. The upper portions of the tools 200 may protrude transversely to the circumference of the second plurality of apertures 128 when the lid 118 is in the closed position. In the closed position of the lid 118, the first plurality of apertures 126 and the second plurality of apertures 128 are coaxially aligned to each other, thereby further restricting the movement of the upper portion of the one or more tools 200. For instance, the first plurality of apertures 126 may prevent one or more tools 200 from moving downwards and the second plurality of apertures 128 may prevent upward movement of the one or more tools 200, thereby securing the one or more tools 200 in a stable position.

In one embodiment, each of the lid 118 and the tool receiving portion 114 has a first dimension DM1 in a first direction D1 and a second dimension DM2 in a second direction D2 that is transverse to the first direction D1. In other words, the first dimension DM1 may form the length of the lid 118 and the tool receiving portion 114, whereas the second dimension DM2 defines a width of the lid 118 and the tool receiving portion 114. In one embodiment, the first direction D1 and the second direction D2 are coplanar with respect to a first reference plane which is coincidental with the support region 117. Further, the first dimension DM1 is greater than the second dimension DM2.

According to one embodiment of the present disclosure, the components of the tool tray 112, i.e., the tool receiving portion 114, the lid 118, the first hinge 130, and the second hinge 120 may be formed as a unitary assembly. To accomplish this, a variety of manufacturing processes may be employed, including but not limited to injection molding or blow molding. Manufacturing the unitary assembly can result in a lower manufacturing cost of the tool tray 112. In addition, such a unitary assembly may yield a higher strength as compared to forming and assembling separate components of the tool tray 112. It may be understood that components having high tensile strength may be employed in manufacturing one or more components of the tool tray 112, which may include a wide variety of materials including, but not limited to, metals, alloys, composites, and polymer.

Figure 3:
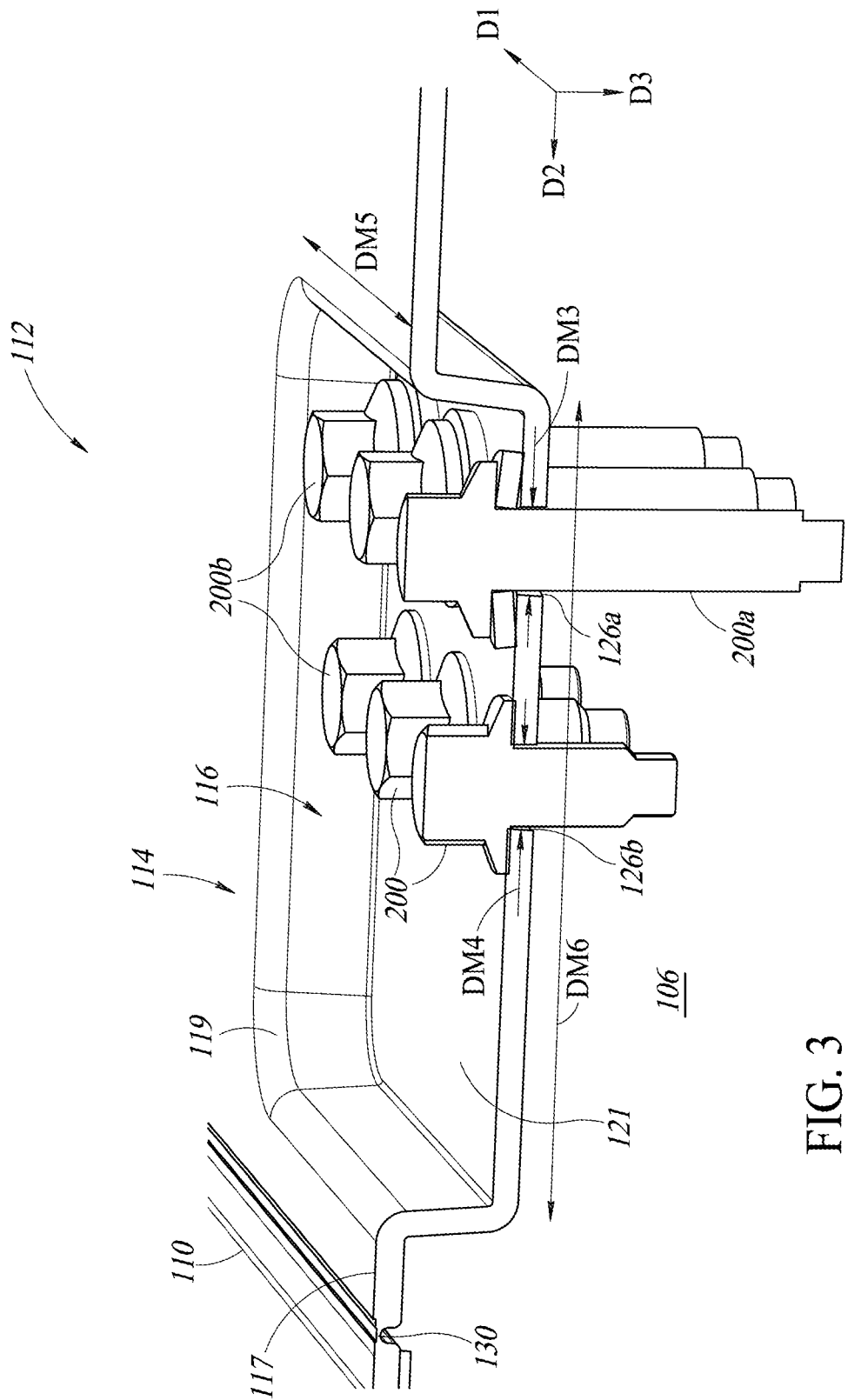
FIG. 3 is a cross-sectional view taken along lines 3-3 of FIG. 2, according to an embodiment of the present disclosure.

FIG. 3 is a cross-sectional view of a portion of the tool tray 112 of FIG. 2 taken along the line 3-3, according to an embodiment. The tool tray 112 includes a first hinge 130 that couples the tool receiving portion 114 to the rear cargo scuff 110.

As discussed previously, the first hinge 130 may be a living hinge. In this case, the first hinge 130 is an extension of the material of the tool receiving portion 114 and the rear cargo scuff 110. In the example of a living hinge, at least a portion of the tool receiving portion 114 is integral with the rear cargo scuff 110 and the living hinge. The living hinge may correspond to an integral, material connection between the rear cargo scuff 110 and tool tray 112 that has been thinned, compressed, or bent in such a way that the tool tray can pivot about the thinned, compressed, or bent portion.

The living hinge, and, by extension, the rear cargo scuff 110 and the tool tray 112 may be made of a tough, durable material. The material is selected such that the rear cargo scuff 110 may perform protective functions and such that the living hinge may rotate thousands of times over the lifetime of the vehicle 100 without losing integrity and failing. In one embodiment, the living hinge, the rear cargo scuff 110, and the tool tray 112 are made from a durable, heavy-duty plastic material. In one embodiment, the living hinge, the rear cargo scuff 110, and the tool tray 112 are made from a composite material including one or more of plastic, fibers, and metal. Any suitable material may be used for the tool tray 112, the rear cargo scuff 110, and the living hinge, without departing from the scope of the present description.

As discussed above, the tool tray 112 includes the first plurality of apertures 126 formed on at least a portion of the recess 116. The first plurality of apertures 126 are configured to accommodate the one or more tools 200 in a manner that lower portions 200a of the one or more tools 200 extends into the storage area 106, whereas upper portions 200b of the one or more tools 200 rest on the top surface 121 of the recess 116 along a third direction D3. In one example, the third direction D3 can be a vertical axis that is perpendicular to the first reference plane. Further, edges 119 around the recess 116 are curved in shape, thereby mitigating the risk of hurting a user's hand when the user accesses the recess 116 to store and/or take out the one or more tools 200, for example. Although the edges 119 of the recess 116 shown in this embodiment are curved in shape, it may be contemplated that the edges 119 may take any suitable shape, such as chamfered edges, for example.

According to one embodiment of the present disclosure, one or more of the first plurality of apertures 126 may vary in size and shape to accommodate tools 200 of varied dimensions. To illustrate this, the first plurality of apertures 126 includes a first aperture 126a and a second aperture 126b such that the first aperture 126a has a first dimension DM3 in the second direction D2 along a second reference plane that is coincidental with the top surface 121 of the recess 116. Similarly, the second aperture 126b has a second dimension DM4 in the second direction D2 along the top surface 121 of the recess 116. As may be understood, the first and second dimensions DM3 and DM4 indicate the diameter of the first and second apertures 126a and 126b, respectively. In another embodiment, the first and second dimensions DM3 and DM4 indicate a bore size of the apertures 126a and 126b. In the illustrated embodiment, the first dimension DM3 is greater than the second dimension DM4. Accordingly, the first aperture 126a may accommodate a bigger sized tool of the one or more tools 200 as compared to the second aperture 126b.

In one embodiment, the size of the recess 116 determines the number of the first plurality of apertures 126 that may be formed therein, thus determining the number of tools that may be accommodated by the tool tray 112. In one example, the size of the recess 116 is determined by a multiple of a third dimension DM5 and a fourth dimension DM6 that are along the second reference plane. Here, the third dimension DM5 extends along the length of the recess 116 in the first direction D1 and the fourth dimension DM6 extends along the second direction D2, such that the third dimension DM5 is greater than the fourth dimension DM6. The third dimension DM5 may be less than the first dimension DM1 of the tool tray 112 and the fourth dimension DM6 may be less than the second dimension DM2 of the tool tray 112. In other words, the tool receiving portion 114 is bigger than the recess 116.

Figure 4:
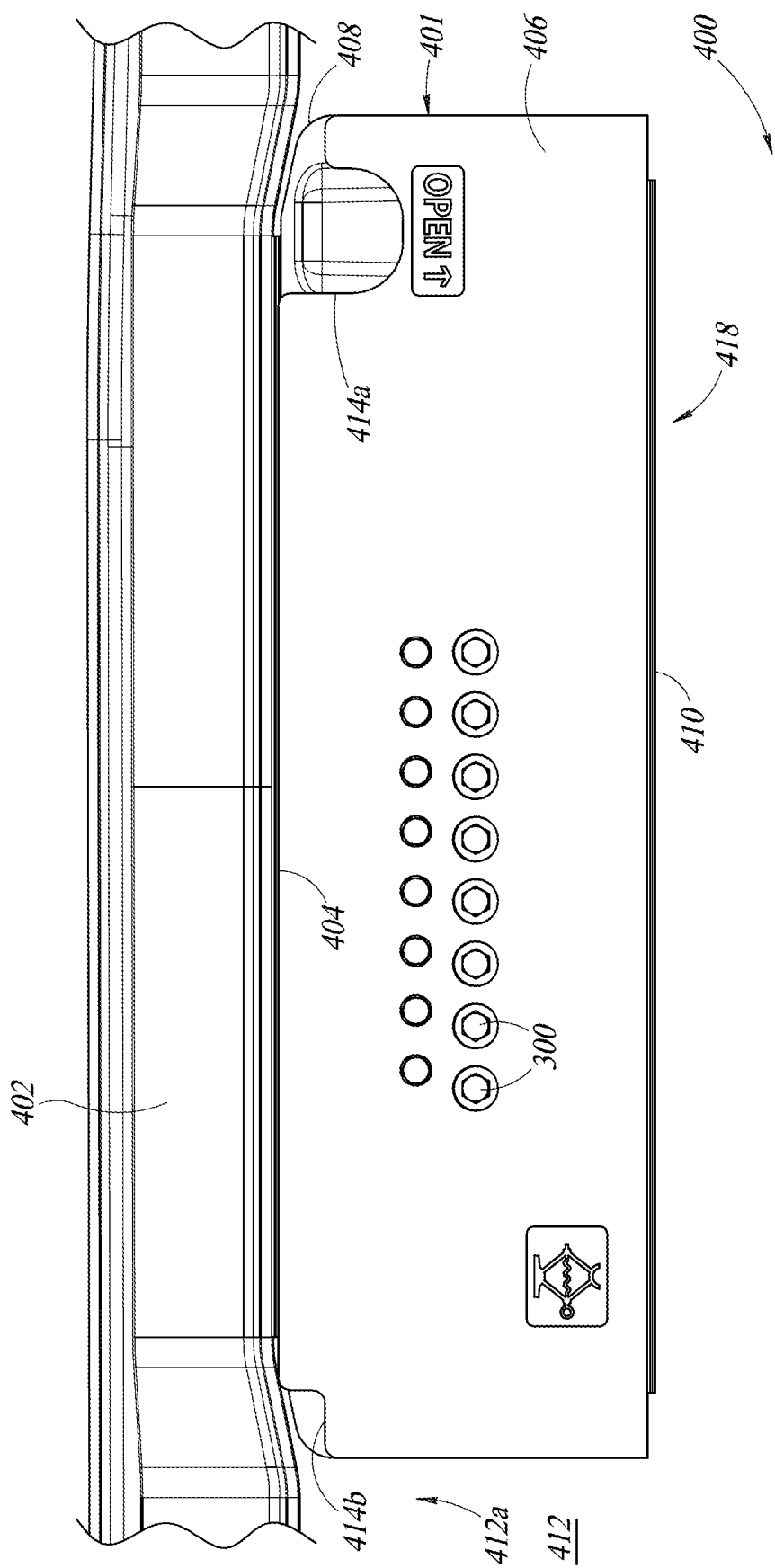
FIG. 4 is a top view of a rear cargo area of a vehicle including a tool tray in a first position, according to an embodiment of the present disclosure.

FIG. 4 is a top view of a rear cargo area 400 of a vehicle, according to one embodiment. A tool tray 401 is coupled to a rear cargo scuff 402, similar to the rear cargo scuff 110, through a first hinge 404. The tool tray 401 includes a lid 406 that is configured to provide selective access to a tool receiving portion 408. In other words, the lid 406 can be operated to cover and uncover the tool receiving portion 408. The tool receiving portion 408 may be employed to accommodate one or more tools 300, such as screwdrivers, fasteners, ratchets, wrenches, or plyers, for example. The lid 406 is coupled to the tool receiving portion 408 via a second hinge 410. The lid 406 rotates via the second hinge 410 to transition between a closed position and an open position. In the closed position, the lid 406 rests parallel to a floor 412, similar to the floor 102 and restricts access to one or more tools 300 stored in the tool receiving portion 408. In the open position, the lid 406 is inclined above the floor 412, thereby allowing access to the tool receiving portion 408.

In the illustrated embodiment, the lid 406 includes grooves 414a and 414b that allow the user to move the lid 406 between the open position and the closed position. The grooves 414a and 414b eliminate a need for a handle, lever, or other mechanisms to open and close the lid 406. This may be advantageous as a handle or lever could otherwise cause obstruction when closing a cover such as the cover 108 of FIG. 1.

Figure 6:
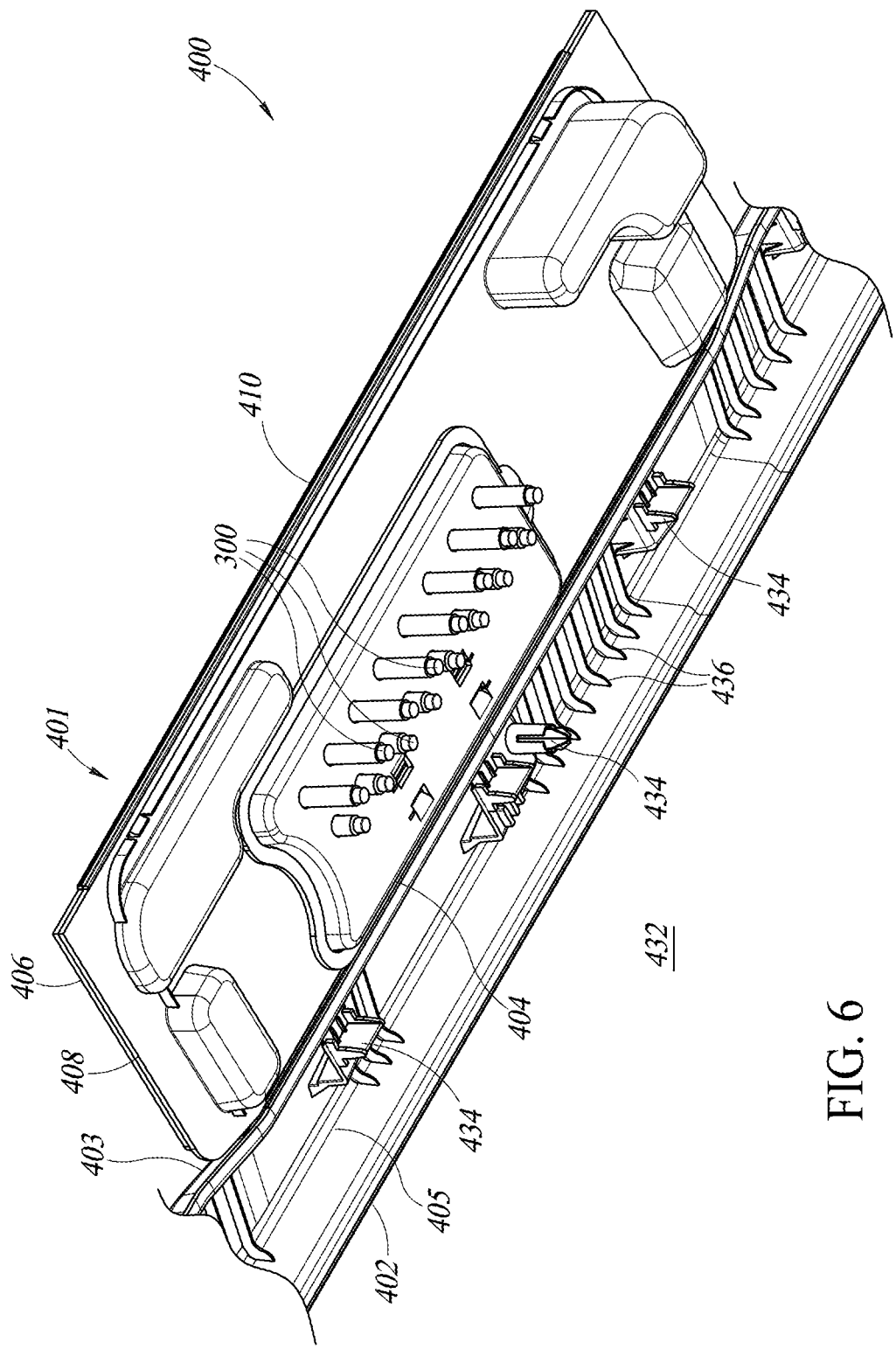
FIG. 6 is a perspective bottom view of the rear cargo area of FIG. 4 with the tool tray in the first position, according to an embodiment of the present disclosure.

The tool tray 401 may be formed using similar material and mechanisms as that of the tool tray 112 discussed with respect to FIGS. 1-3. In addition, the tool tray 401, similar to the tool tray 112 of FIGS. 1-3, transitions between a first position and a second position. The first position is a stowed position in which the tool tray 401 rests below a top surface 412a of the floor 412. The second position is a second position in which the tool tray 401 is above the top surface 412a of the floor 412. In one example, the first hinge 404 allows the tool tray 401 to assume a plurality of positions other than the first position and the second position. For instance, the tool tray 401 may form an acute angle with respect to the floor 412, which allows partial access to a storage area 418, similar to the storage area 106. In one embodiment, the first hinge 404 may also include a coupling mechanism that couples the tool tray 401 to the rear cargo scuff 402, thereby eliminating a need for a separate coupling mechanism. Further, the tool tray 401 in the illustrated embodiment may be detached from the rear cargo scuff 402. FIGS. 5 and 6 discuss details of the tool tray 401 in the first and second positions.

FIG. 5 is a perspective view of the rear cargo area 400 of FIG. 4 in the second position, according to one embodiment. As shown, the tool tray 401 assumes an upright posture in the second position that allows access to the storage area 418. As shown, the tool tray 401 is positioned transverse to the floor 412 in the second position. Such a position may be advantageous as the position avoids any hindrance while storing and/or removing the one or more tools 300 and/or cargo that is stored in the storage area 418. The one or more tools 300 and/or cargo that may be placed in the storage area 418 may include tire changing equipment and a spare wheel, for example. Suitable holding mechanisms, such as fasteners, for example, may be used to hold the tool tray 401 in this transverse and/or the second position.

The tool receiving portion 408 of the tool tray 401 shown here includes a plurality of pockets 420, 422, 424, 426, each having their respective bottom surfaces 420a, 422a, 424a, 426a, respectively, protruding from a bottom surface 428 of the tool receiving portion 408. The plurality of pockets 420-426 may be configured to store loose fasteners, such as nuts, bolts, screws, and washers, for example. Each pocket of the plurality of pockets 420-426 is sized and shaped to store fasteners of different shapes and sizes. For instance, the pocket 420 may store nails and bolts, while the pocket 422 may store nuts.

In the illustrated embodiment, the tool tray 401 includes a rim 430 that runs along a periphery of the bottom surface 428 and mates with a portion of edges 432a of an opening 432 of the floor 412 to create a seal between the tool tray 401 and the opening 432. Such a seal may secure the tool tray 401 in a stable position and may prevent the ingress of dust or liquid into the opening 432. The rim 430 may be press-fit into the opening 432 along the edge 432a to secure the tool tray 401 in the first position.

FIG. 6 is a bottom perspective view of the rear cargo area of FIG. 4, according to an embodiment. The tool tray 401 is in the first position in FIG. 6. As shown, the rear cargo scuff 402 includes a plurality of locking members 434 that are configured to secure the rear cargo scuff 402 to a body of the vehicle. The locking members 434 may include snap locks that are inserted into holes formed in the body of the vehicle. Separately, the rear cargo scuff 402 may include a plurality of ribs 436 that provides structural rigidity to the rear cargo scuff 402, while allowing a better coupling to the body of the vehicle. For instance, the plurality of ribs 436 may be contoured to wrap around a portion of the body of the vehicle to which the rear cargo scuff 402 is mounted. In the illustrated embodiment, the rear cargo scuff 402 has a bottom side 405 that is coupled to the first hinge 404, thus allowing the first hinge 404 to rotate the tool tray 401 to the upright posture (i.e., the second position, as shown in FIG. 5). The rear cargo scuff 402 further includes a top side 403 opposite to the bottom side 405. As shown, the tool tray 401 in the first position rests below the top side, which is below the floor 412. As mentioned before, in one embodiment, the first hinge 404 can be detached from the bottom side to remove the tool tray 401 from the opening 432.

Figure 7:
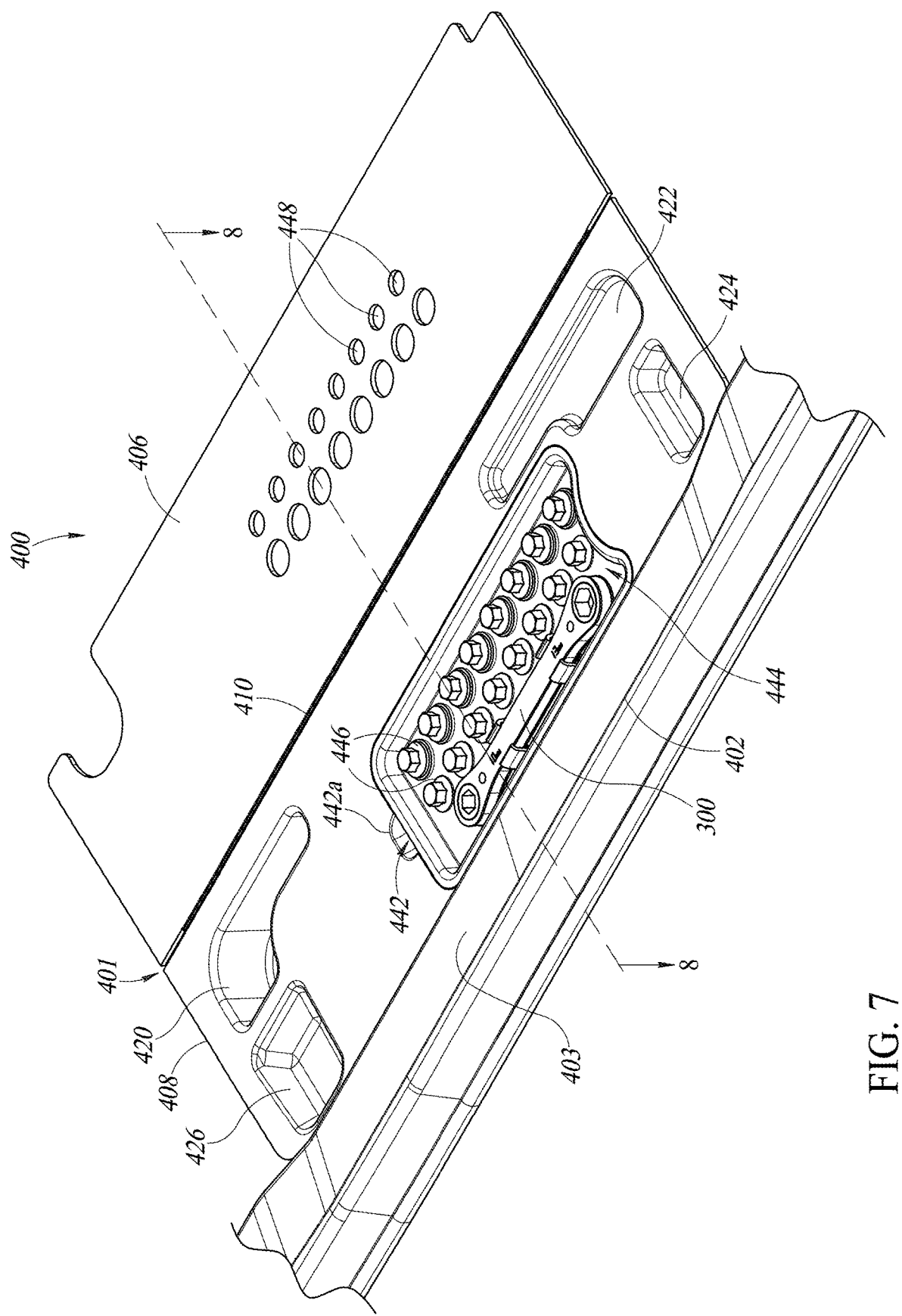
FIG. 7 is an enhanced schematic view of the rear cargo area of FIG. 4, according to an embodiment of the present disclosure.

FIG. 7 is a perspective view of the rear cargo area 400 of FIG. 4, according to an embodiment. The tool tray 401 includes the tool receiving portion 408 coupled to the rear cargo scuff 402 via the first hinge 404 (not shown here) and to the lid 406 via the second hinge 410. Further, as shown, the tool receiving portion 408 is installed below the top side 403 of the rear cargo scuff 402. The tool receiving portion 408 includes a cavity 442 housing a recess 444 (similar to the recess 116) that is removably positioned inside the cavity 442. The recess 444 has a shape or configuration suitable to hold the tools 200. In one example, the recess 444 may have a rectangular shape or a square shape. Alternatively, the recess 444 can have other shapes based on the type and number of tools 200 to be stored in the recess 444. In one example, the cavity 442 includes a side opening 442*a* that allows the user to remove the recess 444 from the cavity 442.

In the illustrated embodiment, the recess 444 is functionally similar to the recess 116 of FIG. 2. However, the removable recess 444 makes the tool tray 401 modular and, accordingly, enables the user to replace the recess 444 having one configuration with another recess having another configuration. In addition, the user may access the storage area 418 without a need of transitioning the tool tray 401 to the second upright position (discussed in FIG. 4).

In the illustrated example, the recess 444 includes a plurality of first apertures 446, similar to the first plurality of apertures 126 shown in FIG. 2. On the other hand, the lid 406 includes a plurality of second apertures 448, similar to the second plurality of apertures 128 shown in FIG. 2. The plurality of first apertures 446 aligns with the plurality of second apertures 448 when the lid 406 moves to the closed position. Further, the plurality of second apertures 448 allows a portion of the one or more tools 300 to protrude above the lid 406 when the lid 406 is in the closed position. It should be noted that the lid 406 may transition between the closed and open positions in a manner similar to that discussed with respect to the tool tray 112 of FIG. 1-3.

Figure 8:
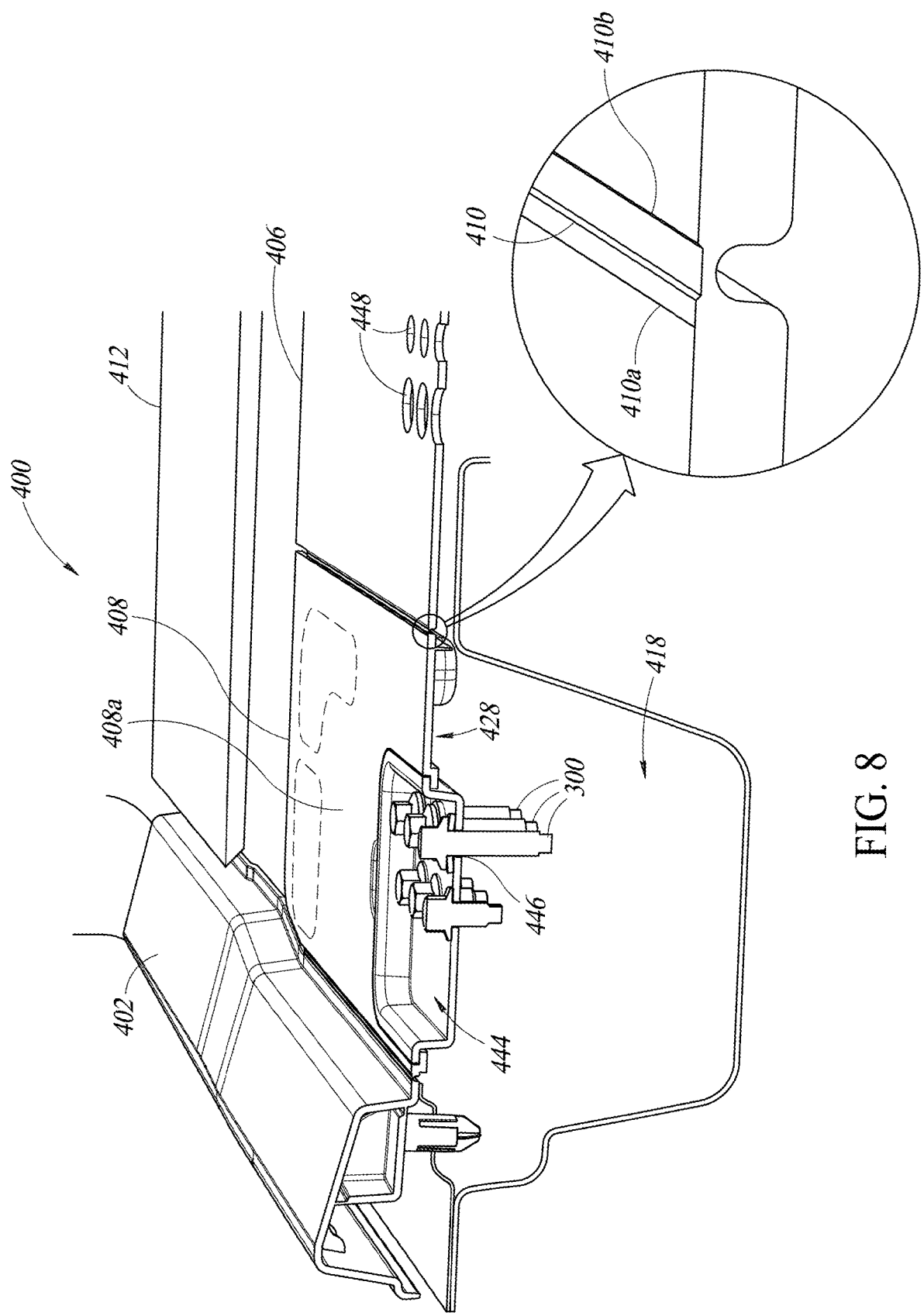
FIG. 8 is a cross-sectional side view of the rear cargo area of FIG. 7 taken along cut lines 8-8 with a lid of the tool tray in an open position, according to an embodiment of the present disclosure.

FIG. 8 is a cross-sectional side view of the rear cargo area 400 of FIG. 7 taken along lines 8-8, according to an embodiment. The plurality of first apertures 446 allows the lower portion of the one or more tools 300 to protrude through the bottom surface 428. In the illustrated embodiment, the second hinge 410 is a living hinge and includes a first side 410*a* and a second side 410*b*, where the first side 410*a* is coupled to the tool receiving portion 408 while the second side 410*b* is coupled to the lid 406. In operation, the second hinge 410 allows the lid 406 to rotate with respect to the tool receiving portion 408 between the closed position (shown in FIG. 4) and the open position (shown in FIG. 7). In one embodiment, the lid 406, the recess 444, and a support region 408*a* of the tool receiving portion 408 (similar to the support region 117) are designed and sized with respect to each other to ensure little or no relative motion of these components. An example embodiment illustrating dimensional relationships of the lid 406, the recess 444, and the support region 408*a* is explained with respect to FIG. 9.

Figure 9:
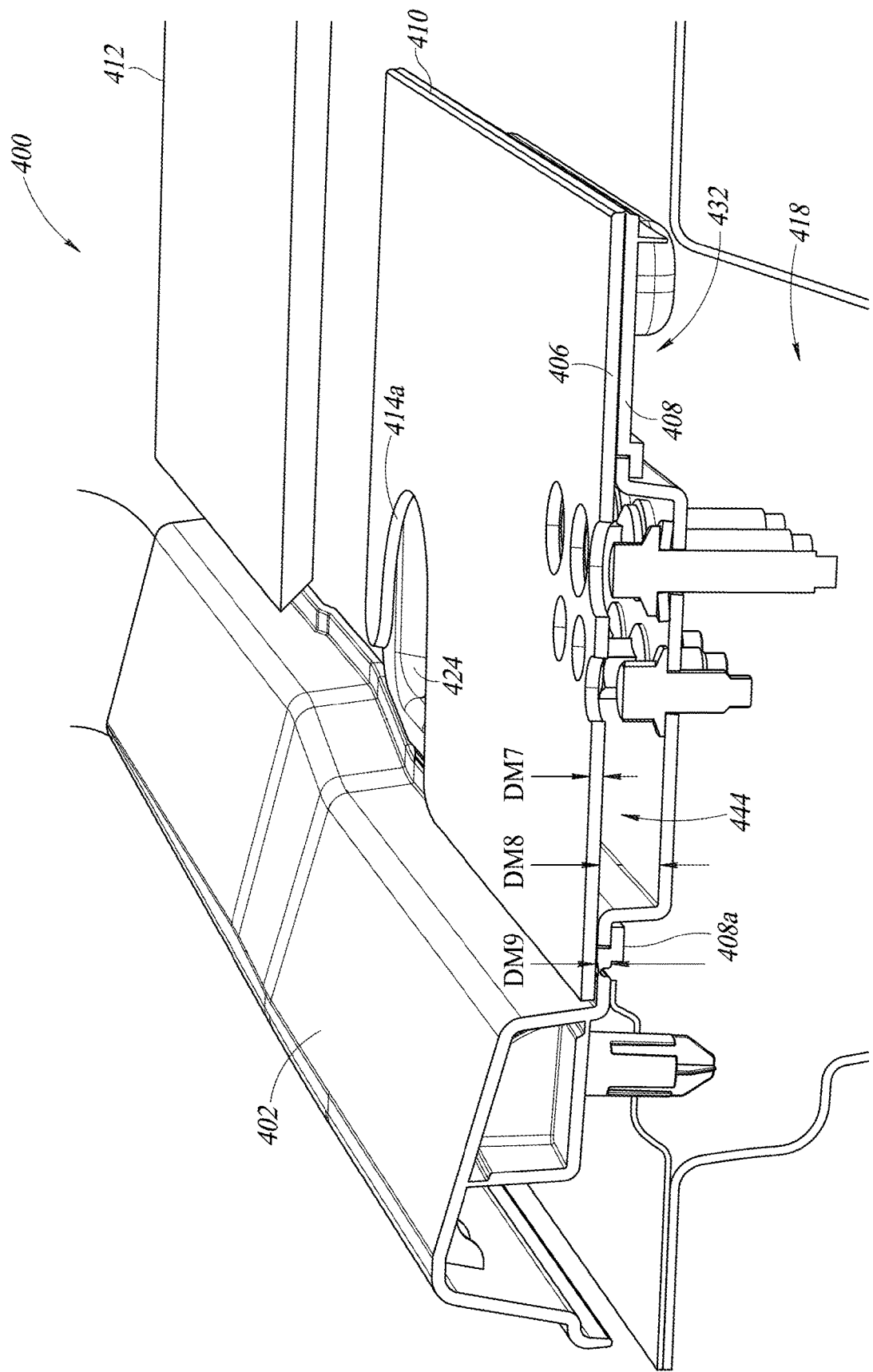
FIG. 9 is a cross-sectional side view of the rear cargo area of FIG. 7 taken along cut lines 8-8 with a lid of the tool tray in a closed position, according to an embodiment of the present disclosure.

FIG. 9 is another cross-sectional view of the rear cargo area 400 taken along cut lines 8-8 with the lid 406 of the tool tray 401 in the closed position, according to an embodiment. In one embodiment, the lid 406 has a fifth dimension DM7 in a third direction D3, which is transverse to the first direction D1 and the second direction D2. The recess 444 has a sixth dimension DM8 in the third direction D3, such that the sixth dimension DM8 is greater than the fifth dimension DM7. In other words, a thickness of the lid 406 is less than a depth of the recess 444 so that the top portion of the one or more tools 300 can be accommodated in the recess 444. Moreover, the support region 408*a* has a seventh dimension DM9 in the third direction D3, which is less than the sixth dimension DM8. In other words, a thickness of the support region 408*a* is less than the depth of the recess 444. It should be noted that the tool tray 112 discussed in previous embodiments may have a similar fifth dimension DM7, sixth dimension DM8, and seventh dimension DM9.

Figure 10:
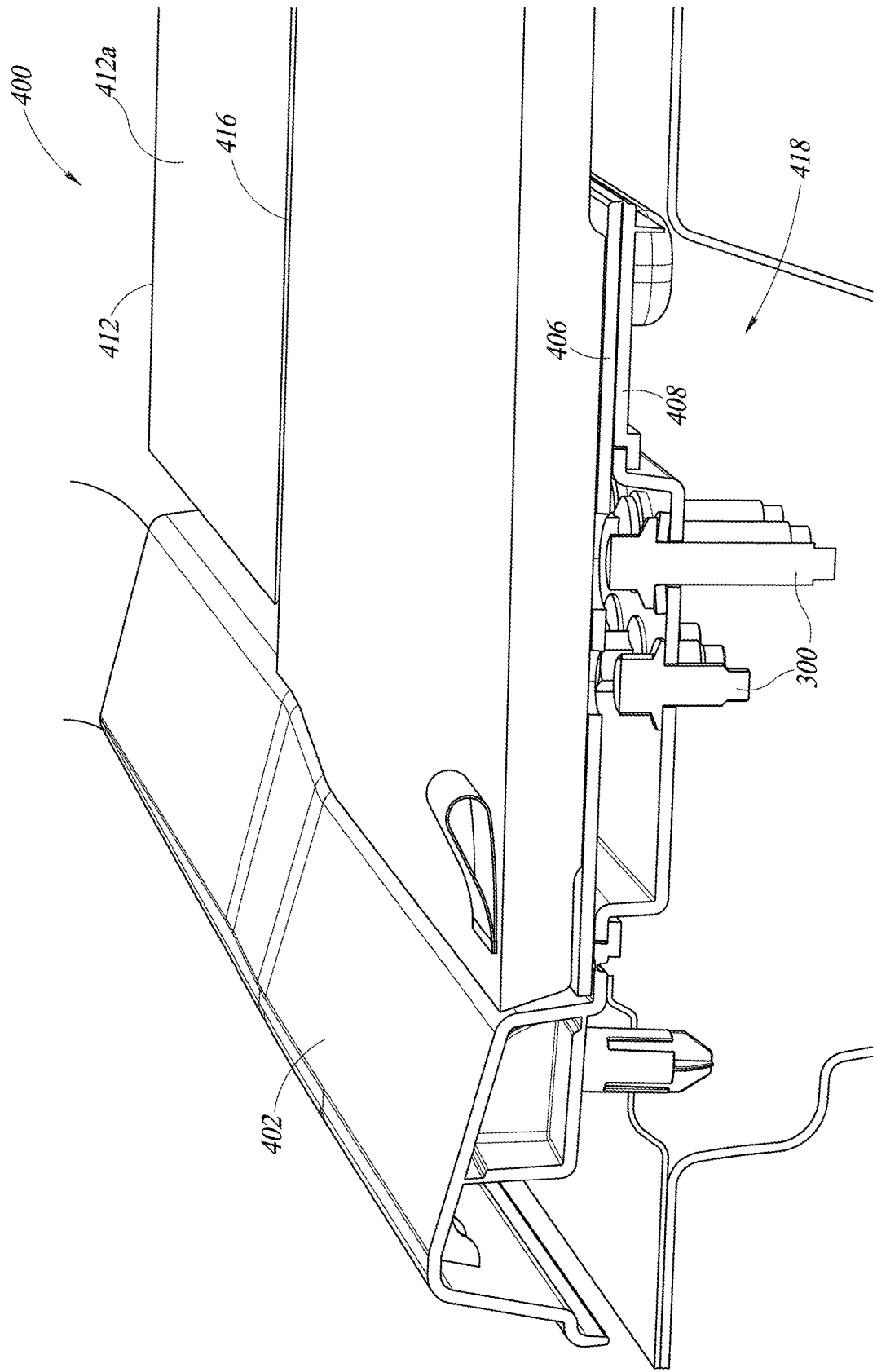
FIG. 10 is a cross-sectional view of the rear cargo area of FIG. 7 taken along cut lines 8-8 with a cover in a closed position, according to an embodiment of the present disclosure.

FIG. 10 shows yet another cross-section of the tool tray 401 taken along cut lines 8-8 with the cover 416 in the closed position, according to an embodiment. In the illustrated embodiment, the tool tray 401 is in the second position, thus resting below the top surface 412*a* of the floor 412. Accordingly, when the cover 416 is closed, the tool tray 401 does not obstruct the closing of the cover 416 and the cover 416 remains flush with the floor 412. As a result, a flat surface throughout the rear cargo area 402 is achieved. Moreover, the tool tray 401 stores the one or more tools 300 in such a way that the one or more tools 300 do not obstruct the closing of the cover 416. In one example, the one or more tools 300 stored in the tool tray 401 do not contact the cover 416, thereby preventing the rattling and squeaking noises that otherwise may be produced if the one or more tools 300 are in contact with the cover 416.

Figure 11:
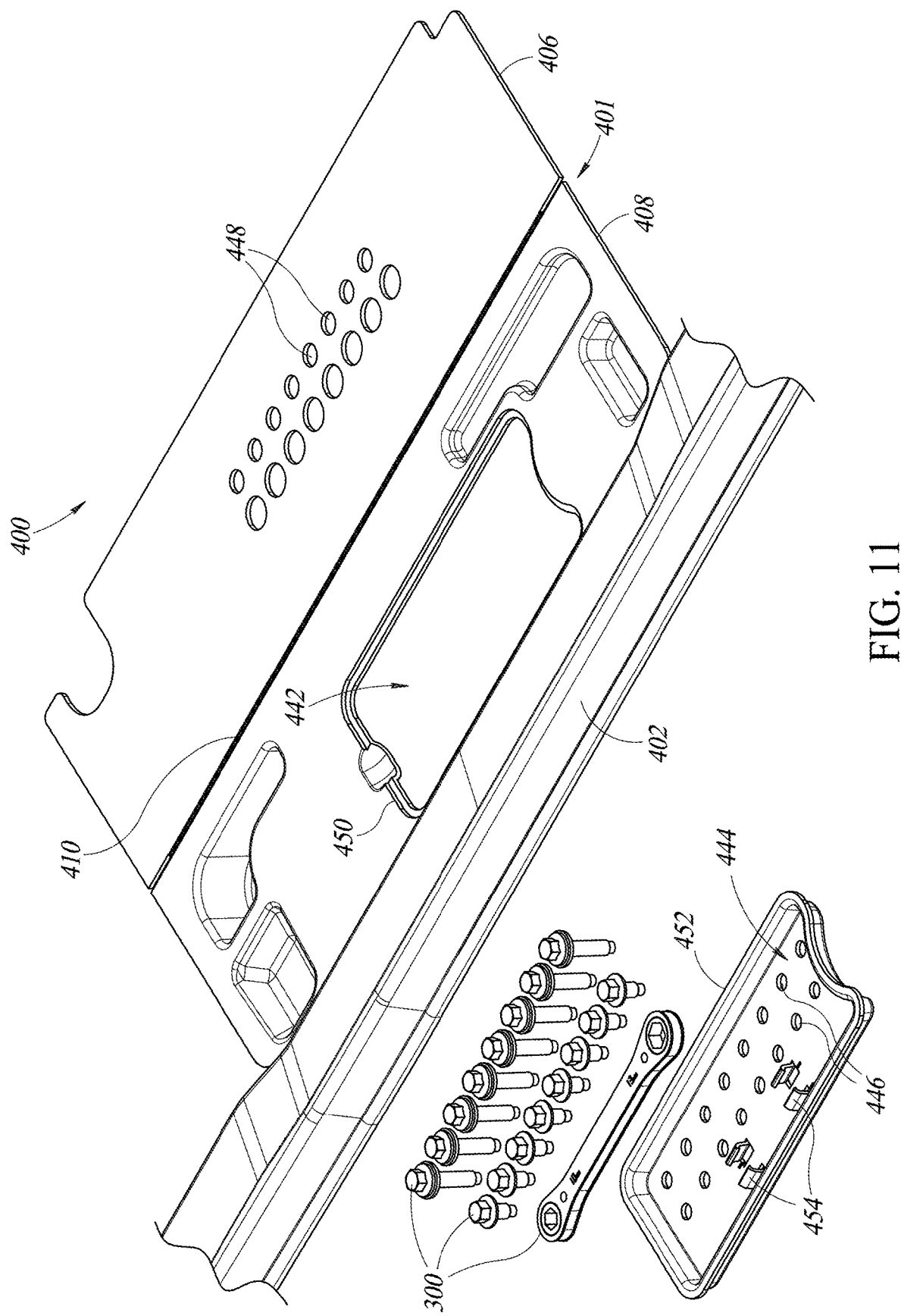
FIG. 11 is an exploded view of the rear cargo area of FIG. 7, according to an embodiment of the present disclosure.

FIG. 11 is an exploded view of the tool tray 401 shown in FIG. 7, according to an embodiment. The tool receiving portion 408 includes the cavity 442 that may accommodate the recess 444. As may be seen, edges 450 are formed along a periphery of the cavity 442 and flanges 452 are formed along a periphery of the recess 444, such that the flanges 452 mates with the edges 450 when the recess 444 is installed inside the cavity 442.

In one example, the recess 444 includes one or more slots 454 that are shaped to house additional tools, such as spanners that can be used to detach and reattach one or more detachable doors and/or wheels of the vehicle. In one embodiment, the slots 454 may reversibly bend to allow the insertion of the tools 300 therein. In another embodiment, the slots 454 may wrap around the tools to secure the tools in a manner that relative play of the tools with respect to the tool tray 401 is reduced.

One embodiment of the present disclosure relates to the manufacturing of a vehicle, and specifically, to the installation of a tool tray, such as the tool tray 112 or the tool tray 401 inside a rear cargo area. The tool tray may be assembled by forming an opening in the floor and forming a storage area in the opening, where the storage area may be used to store tire changing equipment. The opening and the storage area can be formed at the time of the manufacturing of the body of the vehicle. Thereafter, the tool tray is coupled to a rear cargo scuff using a first living hinge 130 that allows the tool tray to rotate between a first position in which the tool tray is below a floor, and a second position in which the tool tray is above the floor. Further, the rotation of the tool tray between the first position and the second position is permitted by the opening formed in the floor.

Moreover, the tool tray is rotated to the second position to gain access to the storage area below the floor. Once the tool tray is coupled to the rear cargo scuff, the lid is coupled to the tool tray using a second living hinge, such that the second hinge 120 allows the lid to assume the open position and the closed position, as explained in the above embodiments. Once coupled, the lid may be operated to gain access to the recess to store and/or take out the one or more tools.

In one embodiment, a vehicle includes a rear cargo area. The rear cargo area includes a floor. The floor has an opening. The vehicle includes a floor a rear cargo scuff abutting the floor. The tool tray is connected to the rear cargo scuff by a first hinge. The tool tray is configured to rotate, via the first hinge, between a first position and a second position. In the first position, the tool tray rests below a top surface of the floor. In the second position, the tool tray is positioned above the top surface of the floor. When the tool tray is in the second position, a cargo storage area below the floor can be accessed.

In one embodiment, the tool tray includes a tool receiving portion configured to receive tools. The tool tray includes a second hinge and a lid coupled to the second hinge. The tool tray includes a tool receiving portion and the lid is configured to rotate, via the second hinge, between a closed position and an open position. In the closed position, the lid covers the tool receiving portion. The tool receiving portion includes a plurality of first apertures configured to hold tools.

In one embodiment, the plurality of first apertures is configured to enable portions of the tools to protrude below a bottom surface of the tool tray. The lid includes a plurality of second apertures configured to enable portions of the tools to protrude above the lid when the lid is in the closed position.

In one embodiment, the vehicle includes a rear door configured to permit access to the rear cargo area and the rear cargo scuff is positioned to contact the rear door when the rear door is closed. The first hinge is configured to enable the tool tray to rotate from the first position toward the rear door. The second hinge is configured to enable the lid to rotate from the closed position away from the rear door when the tool tray is in the first position. In one embodiment, the first and second hinges are living hinges. In one embodiment, the tool tray includes one or more lid coupling mechanisms configured to securely hold the lid in the closed position.

In one embodiment, the vehicle includes a plurality of doors such that one or more of the doors is detachable and the tool receiving portion includes one or more slots shaped to hold tools for detaching and reattaching the one or more doors.

In one embodiment, the vehicle includes a storage area below the tool tray when the tool tray is in the first position and rotating the tool tray to the second position enables access to the storage area. In one embodiment, the storage area is configured to store tire changing equipment.

In one embodiment, a method includes coupling a tool tray to a rear cargo scuff of a vehicle by a first living hinge, and the tool tray is configured to rotate, via the first living hinge, between a first position below a floor of a rear cargo area of the vehicle to a second position above the floor. The method also includes coupling a lid to the tool tray by a second living hinge, such that the lid is configured to rotate, via the second living hinge, between a closed position and an open position, and in the closed position the lid covers a tool receiving portion of the tool tray. Moreover, the tool receiving portion is accessible in the open position.

In one embodiment, the method includes forming a storage area below the floor and accessible by rotating the tool tray to the second position. In one embodiment, the method includes forming an opening in the floor configured to permit the tool tray to rotate from the first position to the second position.

In one embodiment, a vehicle includes a tool tray. The tool tray includes a tool receiving portion having a recess and a first plurality of apertures in the recess. The tool tray includes a first hinge on a first side of the tool receiving portion, a second hinge on a second side of the tool receiving portion, and a lid coupled to the second hinge. The lid includes a second plurality of apertures. In one embodiment, the first plurality of apertures is aligned with the second plurality of apertures. The first plurality of apertures includes a first aperture and a second aperture. The first dimension in the first direction of the first apertures is greater than a second dimension in the first direction of the second aperture.

In one embodiment, the tool receiving portion includes a support region around the recess. In one embodiment, the tool tray includes a first dimension in a first direction and a second dimension in a second direction that is transverse to the first direction. The first dimension is greater than the second dimension, and the lid and the support region have the first and second dimensions. The recess includes a third dimension in the first direction and a fourth dimension in the second direction, the third dimension being less than the first dimension and the fourth dimension is less than the second dimension. The lid includes a fifth dimension in a third direction that is transverse to the first direction and the second direction. The recess includes a sixth dimension in the third direction, the sixth dimension being greater than the fifth dimension. The support region includes a seventh dimension in the third direction, the seventh dimension being less than the sixth dimension.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A vehicle, comprising:
   a rear cargo area including a floor;
   an opening in the floor;
   a rear cargo scuff abutting the floor; and
   a tool tray connected to the rear cargo scuff by a first hinge, wherein the tool tray includes:
   a tool receiving portion coupled to the rear cargo scuff by the first hinge, wherein the tool receiving portion includes a plurality of the first apertures configured to hold tools; and
   a lid coupled to the tool receiving portion via a second hinge.

2. The vehicle of claim 1, wherein the tool tray is configured to rotate, via the first hinge, between a first position and a second position, wherein in the first position the tool tray rests below a top surface of the floor, wherein in the second position the tool tray is positioned above the top surface of the floor, the tool tray being accessible via the opening in the floor.

3. The vehicle of claim 1, wherein the lid is configured to rotate, via the second hinge, between a closed position and an open position, such that the lid covers the tool receiving portion in the closed position and provides access to the tools in the open position.

4. The vehicle of claim 3, further comprising a rear door configured to permit access to the rear cargo area, wherein the rear cargo scuff is positioned to contact the rear door when the rear door is closed.

5. The vehicle of claim 4, wherein the first hinge is configured to enable the tool tray to rotate from the first position toward the rear door.

6. The vehicle of claim 5, wherein the second hinge is configured to enable the lid to rotate from the closed position away from the rear door when the tool tray is in the first position.

7. The vehicle of claim 1, further comprising a plurality of doors, wherein one or more of the doors is detachable, wherein a tool receiving portion of the tool tray includes one or more slots shaped to hold tools for detaching and reattaching the one or more doors.

8. The vehicle of claim 2, further comprising a storage area below the tool tray when the tool tray is in the first position, wherein rotating the tool tray to the second position enables access to the storage area.

9. A method, comprising:
   forming a tool tray to a rear cargo scuff of a vehicle by a first living hinge, wherein the tool tray is configured to rotate, via the first living hinge, between a first position below a floor of a rear cargo area of the vehicle to a second position above the floor;
   forming a lid to the tool tray by a second living hinge, wherein the lid is configured to rotate, via the second living hinge, between a closed position and an open position, wherein in the closed position the lid covers a tool receiving portion of the tool tray, wherein in the open position the tool receiving portion is accessible; and
   forming a storage area below the floor and accessible by rotating the tool tray to the second position.

10. The method of claim 9, further comprising forming an opening in the floor configured to permit the tool tray to rotate from the first position to the second position.

11. A vehicle, comprising:
    a tool tray including:
        a tool receiving portion having:
            a recess;
            a first plurality of apertures defined in the recess;
        a first hinge on a first side of the tool receiving portion;
        a second hinge on a second side of the tool receiving portion; and
        a lid coupled to the second hinge, the lid including a second plurality of apertures.

12. The vehicle of claim 11, wherein the first plurality of apertures is coaxially aligned with the second plurality of apertures in a closed position of the lid.

13. The vehicle of claim 12, wherein the first plurality of apertures includes a first aperture and a second aperture, wherein a first dimension in a first direction of the first aperture is greater than a second dimension in the first direction of the second aperture.

14. The vehicle of claim 13 wherein the tool receiving portion includes a support region around the recess.

15. The vehicle of claim 14 wherein the lid and the support regions both include a first dimension in a first direction and a second dimension in a second direction that is transverse to the first direction, the first dimension being greater than the second dimension.

16. The vehicle of claim 15 wherein the recess includes a third dimension in the first direction and a fourth dimension in the second direction, the third dimension being less than the first dimension and the fourth dimension being less than the second dimension.

17. The vehicle of claim 16 wherein the lid includes a fifth dimension in a third direction that is transverse to the first and second directions, the recess includes a sixth dimension in the third direction, wherein the sixth dimension is greater than the fifth dimension.

18. The vehicle of claim 17 wherein the support region includes a seventh dimension in the third direction, the seventh dimension being less than the sixth dimension.

* * * * *